(12) United States Patent
Balasubramanian et al.

(10) Patent No.: US 6,922,636 B2
(45) Date of Patent: Jul. 26, 2005

(54) DETECTION OF ROAD CONDITIONS USING A BEAM FROM AN EXTERNAL SYSTEM I.E. GPS, DBS

(75) Inventors: B. Kannan Balasubramanian, Kolhapur (IN); Seshu Bhagavathula, Ulm (DE); Shanmukh Katragadda, Bangalore (IN)

(73) Assignee: DaimlerChrysler AG, Stuttgart (DE)

( * ) Notice: Subject to any disclaimer, the term of this patent is extended or adjusted under 35 U.S.C. 154(b) by 263 days.

(21) Appl. No.: 10/168,623

(22) PCT Filed: Dec. 16, 2000

(86) PCT No.: PCT/EP00/12845
§ 371 (c)(1),
(2), (4) Date: Oct. 29, 2002

(87) PCT Pub. No.: WO01/47759
PCT Pub. Date: Jul. 5, 2001

(65) Prior Publication Data
US 2003/0171872 A1 Sep. 11, 2003

(30) Foreign Application Priority Data
Dec. 24, 1999 (DE) .......................................... 199 62 949

(51) Int. Cl.$^7$ .............................................. G06F 19/00
(52) U.S. Cl. .............................................. 702/2; 702/5
(58) Field of Search ........................ 702/2, 5; 701/223; 382/100, 108

(56) References Cited

U.S. PATENT DOCUMENTS

| 4,560,279 A | * | 12/1985 | Kouns | 356/369 |
|---|---|---|---|---|
| 4,653,316 A | | 3/1987 | Fukuhara | 73/146 |
| 4,690,553 A | | 9/1987 | Fukamizu et al. | 356/51 |
| 5,446,461 A | | 8/1995 | Frazier | 342/22 |
| 5,497,100 A | | 3/1996 | Reiser et al. | 324/643 |
| 5,521,594 A | | 5/1996 | Fukushima | 340/901 |
| 5,557,261 A | * | 9/1996 | Barbour | 340/580 |
| 5,675,081 A | | 10/1997 | Solheim et al. | 73/170.28 |
| 5,793,329 A | | 8/1998 | Nakada et al. | 342/357 |
| 5,926,125 A | | 7/1999 | Wood | 342/25 |
| 6,615,648 B1 | * | 9/2003 | Ferguson et al. | 73/146 |
| 2002/0010557 A1 | * | 1/2002 | Mann | 702/32 |

FOREIGN PATENT DOCUMENTS

| DE | 42 00 299 A1 | 9/1992 |
|---|---|---|
| DE | 39 40 253 A1 | 6/1998 |
| JP | 10115684 A | 6/1998 |

OTHER PUBLICATIONS

Curlander, John C.; McDonough, Robert N.: *Synthetic Aperture Radar Systems and Signal Processing*, New York (u.a.): John Wiley & Sons, Inc. 1991 S. p. 41.

* cited by examiner

Primary Examiner—Donald McElheny, Jr.
(74) Attorney, Agent, or Firm—Crowell & Moring LLP

(57) ABSTRACT

A device for determining ground surface condition, especially for roads includes receivers for receiving at least one scanning radiation component that is reflected from the scanned earth surface region, and contains surface condition information. Evaluation resources determine the surface state of the scanned ground surface region by evaluating the scanning radiation. The scanning radiation component comprises useable signal radiation of a foreign system and/or is generated by one or more satellites.

16 Claims, 3 Drawing Sheets

DETECTION OF ROAD CONDITIONS USING A BEAM FROM AN EXTERNAL SYSTEM I.E. GPS, DBS

This application claims the priority of German patent document 199 62 949.8, filed 24 Dec. 1999 (PCT/EP00/12845, filed 16 Dec. 2000), the disclosure of which is expressly incorporated by reference herein.

The invention relates to a device for determining the state of the ground surface, especially of road surfaces, using scanning radiation.

U.S. Pat. Nos. 4,653,316; 4,690,553; 5,446,461 and 5,497,100 disclose devices of this type for recognition of the state of the surface of roads which are all designed as "active" systems. That they include a scanning radiation transmitter specially provided for this purpose, which generates scanning radiation used, at least one part of which is directed toward the road area to be monitored. (Visible light, for example, from a laser, or infrared radiation or another electromagnetic radiation, is used as scanning radiation.) At least one scanning radiation component reflected from the scanned road region which contains the information on the state of the surface is recorded through suitable receivers and fed to evaluating resources which suitably evaluate it to draw an inference on the surface condition of the scanned road region. The evaluation can entail, according to system design, a comparison of several scanning radiation components directed toward the street region monitored and/or a comparison of one or more such reflected scanning radiation components with an associated reference scanning radiation which reaches the receiver from the scanning radiation transmitter without prior reflection on the road area monitored. The recognition of the condition of the road surface in particular serves to establish whether the street is dry or wet or whether it is covered by snow or ice.

As an alternative to the active system design, U.S. Pat. No. 5,521,594 discloses a "passive" version of a device of the type described above, which utilizes radiation present in any case for other reasons as scanning radiation and therefore manages without a scanning radiation transmitter provided specially for this purpose. The device there, which necessarily must be installed in a motor vehicle, uses ultrasound spurious emission (ultrasound noises which are generated during travel by a motor vehicle tire and are clearly heightened with a wet road in contrast with a dry road). In comparison with active systems, passive systems generally have the advantage that the expenditure for an independent scanning radiation transmitter is unnecessary; and moreover no additional radiation is introduced into the already strongly radiation-stressed environment. The use of ultrasound noise generated by tires is nonetheless basically restricted to distinguishing between dry and wet roads, and above all to systems installed on a part of a motor vehicle.

One object of the invention is to provide a device of the type mentioned above which can recognize the state of the surface of thoroughfare areas and other ground surface regions reliably and exactly, with a relatively small expenditure.

Another object of the invention is to provide such a device that can determine what type of paving is present and/or whether the scanned surface is wet or dry or is covered by ice, snow, sand or the like.

These and other objects and advantages are achieved by the apparatus according to the invention, in which the scanning radiation is characteristically formed from the useful signal radiation of a foreign system. ("Useful signal radiation" is here understood to be radiation which functions as a useful signal of the "foreign system", —that is, any other system that exists outside the surface state recognition device.) One embodiment of the invention makes use of a useful signal radiation produced by the foreign system in order introduce it as scanning radiation. In other words, the useful signal radiation is used for two purposes: on the one hand as a useful signal for the foreign system and on the other as scanning radiation for surface state recognition. This embodiment thus constitutes a passive system in the sense defined above, with the additional advantage that it uses useful signal radiation of a foreign system as scanning radiation which is in any case generated by the foreign system. In contrast to using a spurious emission within the framework of such a passive system design, the use of a useful signal radiation has the advantage that the latter will generally be very dependably available since it is to be sure required by the foreign system for its useful signals.

In another embodiment of the invention, the scanning radiation is generated from one or more radiation transmitters arranged on a satellite. This technique makes possible a correspondingly large area use of the scanning radiation on the ground surface; for example, a recognition of the road surface conditions over spacious road traffic networks, without having to install a scanning radiation transmitter in every motor vehicle using the traffic network. This measure of the invention can, if needed, be combined with that of the previous embodiment if the radiation emitted satellite side at the same time forms a useful signal radiation of a satellite-based foreign system.

According to another feature of the invention, the scanning radiation is formed by the radar or radio wave beaming of a satellite-supported locating system, such as GPS (Global Positioning System), or a satellite-supported radio or transmission system, such as DBS (Direct Broadcasting System).

In a further refinement of the device of the invention, the evaluation of the received scanning radiation uses an associated reference scanning radiation component that is also received, (that is, a scanning radiation component which is not reflected from the monitored ground surface region) in addition to the scanning radiation component radiated from the monitored ground surface region, and which is therefore suitable as a reference for comparison with the scanning radiation component reflected from this region which contains information on the condition of the surface. Such a comparison with a reference scanning radiation component can improve the quality of surface state recognition.

In still another refinement of the invention, the reflected state information scanning radiation component, and if need be the additional scanning radiation component or components, are evaluated by the evaluation apparatus at least with respect to amplitude, phase and/or polarization state, whereby the simultaneous use of two or all three of these evaluation criteria can improve the quality of surface state recognition.

According to another embodiment of the invention, the evaluation devices contain suitable classification resources which enable a classification of the surface state into several different, specifiable types; for example, a classification of the condition of a scanned street paving into various paving types, such as concrete, sand, fine stone (such as asphalt, tar and ballast) and coarse stone (such as brick and paving stones).

Other objects, advantages and novel features of the present invention will become apparent from the following detailed description of the invention when considered in conjunction with the accompanying drawings.

DETAILED DESCRIPTION OF THE DRAWINGS

Figure 1:
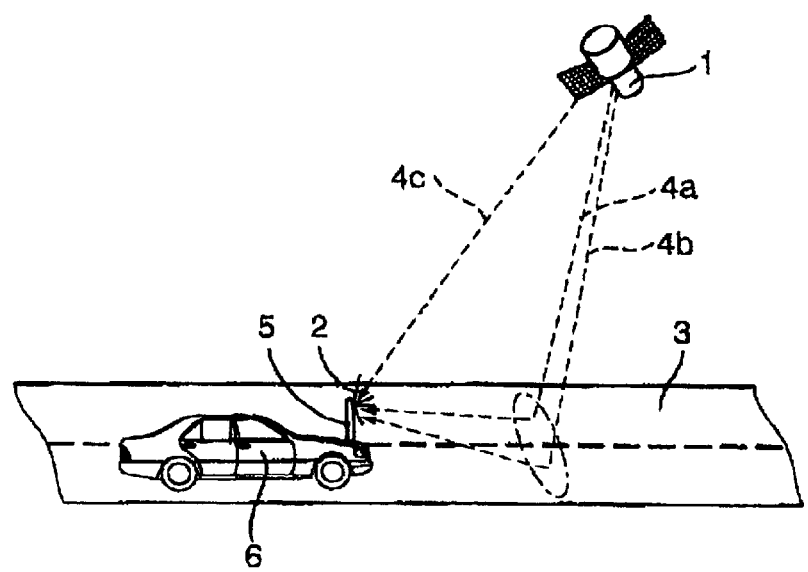
FIG. 1 is a schematic representation of a part of a device for recognizing the surface state of a roadway.

The embodiment represented in the drawings, and explained below in greater detail, represents a device for scanning radiation-based recognition of the state surface of a roadway, using radar or radio wave radiation of a GPS or DBS. The surface state recognition system according to the invention uses the useful signal radiation which is emitted from appropriate GPS or DBS satellites primarily to fulfill the locating or radio or remote data transmission function of the GPS or DBS foreign system.

As represented by way of example in FIG. 1 the useful radiation is emitted from a plurality of participating satellites 1 (of which one is shown) as scanning radiation for surface state recognition, such that three different useful signal radiation components are received as corresponding scanning radiation components and evaluated by the respective antenna unit 2. In particular, a first scanning radiation component 4a with a first polarization state reflected from the monitored road region 3, a second scanning radiation component 4b reflected from the monitored road region 3 with a second polarization state, and a reference scanning radiation component 4c coming directly from the satellites 1 without prior reflection on the monitored road region 3 are received and evaluated. Preferably, GPS as well as DBS useful radiation is used as a scanning radiation for surface state recognition in order to obtain an especially high quality for judging the surface condition.

Since GPS and DBS or TV satellites operate around the globe and are available, the road surface state of traffic networks can be recognized worldwide with the present device with standardized receiver and evaluation parts which are tuned to the standardized GPS or DBS useful radiation, without need of adaptation to different national standards or regulations. By evaluating the useful signals of at least four of the participating satellites 1, the respective time and place coordinates can be determined.

In the example of FIG. 1, in any given case several antenna units 2 are mounted on stationary beacons 5 which are distributed over the road traffic network; in a conventional manner, not shown in greater detail, these beacons can communicate with motor vehicles 6 passing by. The motor vehicles 6 are then outfitted with the associated evaluation element in order to evaluate the scanning radiation data recorded by the antenna unit 2 for recognition of the road surface condition. Alternatively, a street-side, stationary arrangement of evaluation elements and associated indicator units can be provided through which then the local street surface state can be indicated to passing motor vehicles, for example, on existing traffic information beacons or bridges together with other traffic information. In a further alternative, antenna and evaluation element can be arranged completely on the vehicle.

Figure 2:
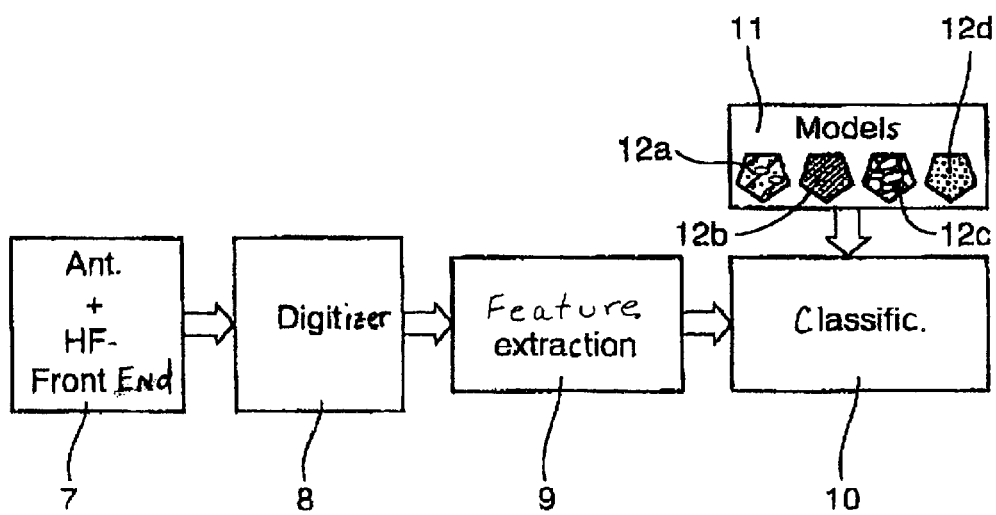
FIG. 2 is a block diagram of a receiver and evaluation element of the device in accordance with FIG. 1.

FIG. 2 is a conceptual schematic block diagram of the structure of the passive device for recognizing street surface conditions. As depicted, a digitizer 8 is connected to an input stage 7 which encloses the antenna element and a high frequency front end. A feature extraction stage 9 is connected to the digitizer downstream in series. The output information from the feature extraction stage 9 is fed into a classification stage 10, where it is compared with model road condition data for the purpose of classification. The latter data are stored in an associated model memory 11, which contains a specifiable number of different model states such as concrete 12a, fine stone (for example, in the form of asphalt, tar or ballast) 12b, coarse stone (for example, in the form of bricks or pavement stone) 12c and sand 12d.

Figure 3:
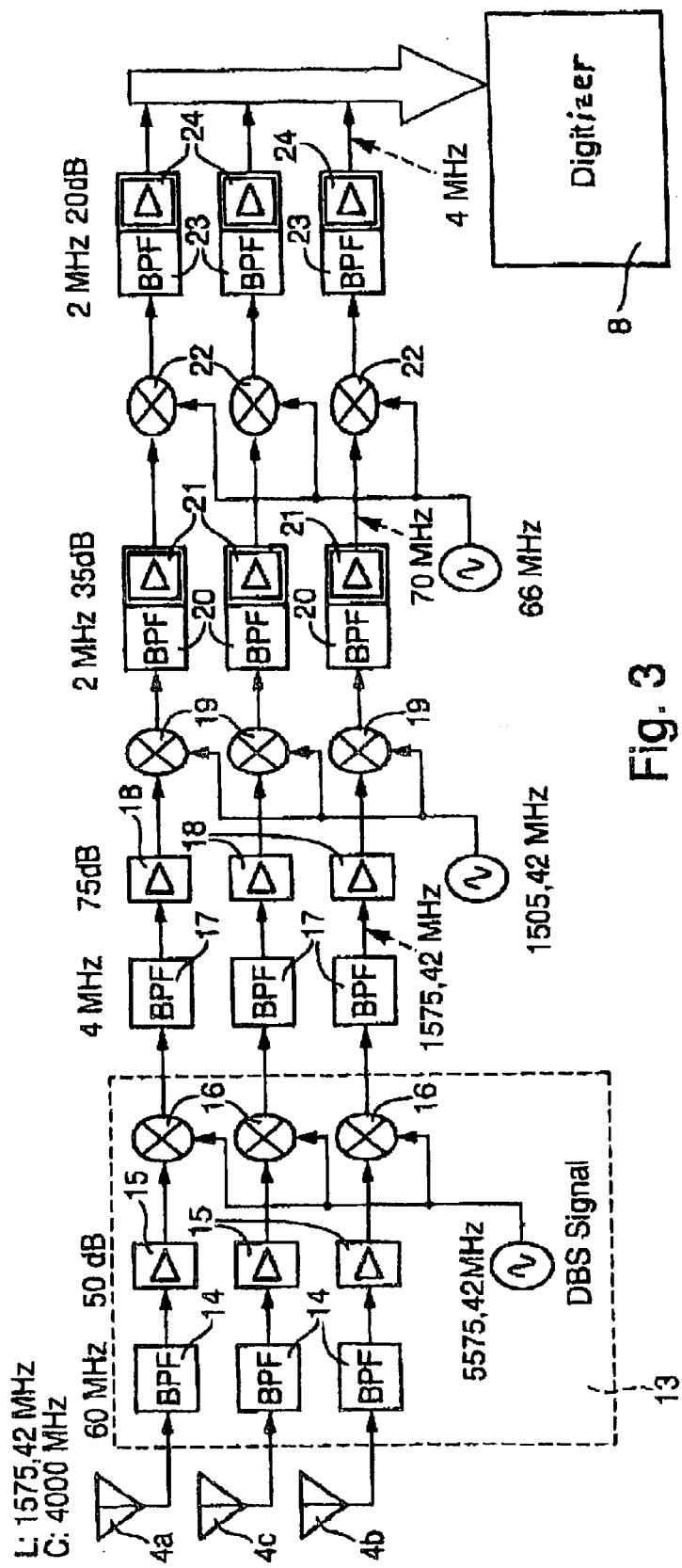
FIG. 3 is a block diagram of the receiver element of FIG. 2.

FIG. 3 shows in greater detail the antenna and HF front end element of FIG. 2 which is designed for receiving DBS signals in the so-called C band (in the region of 4000 MHz), as well as GPS signals in the so-called L band at 1575.42 MHz. Overall, the receiver stage contains three parallel receiving channels for the three different recorded scanning radiation components 4a, 4b, 4c (FIG. 1). The radiation components 4a, 4b, 4c received are then converted down evenly in the three channels in several steps. In particular, the DBS signal components of the three scanning radiation components 4a, 4b, 4c are mixed down to 4 MHz in three steps. The GPS signal components are likewise mixed down to a frequency of 4 MHz, whereby already a twofold downward conversion suffices owing to the low input frequency.

For this purpose, the input signal in the respective channel is first passed through a bandpass filter 14 with a band width of 60 MHz in a first stage 13; thereafter it is amplified in an amplifier 15 with 50 dB and subsequently mixed in a local oscillator 16 with a radio frequency signal at 5575.42 MHz, which is also fed to the oscillator 16. (Stage 13 in particular concerns the DBS signal component.) In a next stage, the signal coming from the local oscillator 16 is passed through a bandpass filter 17 with a band width of 4 MHz in order to obtain a center frequency of 1575.42 MHz (which exists for the GPS signal component from the start).

From this point on, the DBS and the GPS signal components are further processed in the same manner. First of all, they are amplified in an amplifier 18 with 75 dB, after which the amplified signal with a frequency of 1575.42 MHz is mixed with a signal at a frequency of 1505.42 MHz in a local oscillator 19. The mixed signal is passed through a bandpass filter 20 with a bandwidth of 2 MHz, and subsequently reamplified in an amplifier 21 with 35 dB. The amplified signal, which then possesses a center frequency of 70 MHz and a bandwidth of 2 MHz, is mixed with a signal at a frequency of 66 MHz in an additional local oscillator 22, after which it is passed through a bandpass filter 23 with a bandwidth of 2 MHz. It is subsequently amplified in a further amplifier 24 with 20 dB.

The three parallel resulting signals with the desired center frequency of 4 MHz are then fed to the digitizer 8 which contains an A/D converter as an essential element. The three parallel signals with a center frequency of 4 MHz and bandwidth of 2 MHz are digitized in the digitizer 8 to 5 MHz. In the subsequent feature extraction stage 9 (FIG. 2), the three digitized signals are processed further through a suitably designed computer with respect to feature extraction.

Figure 4:
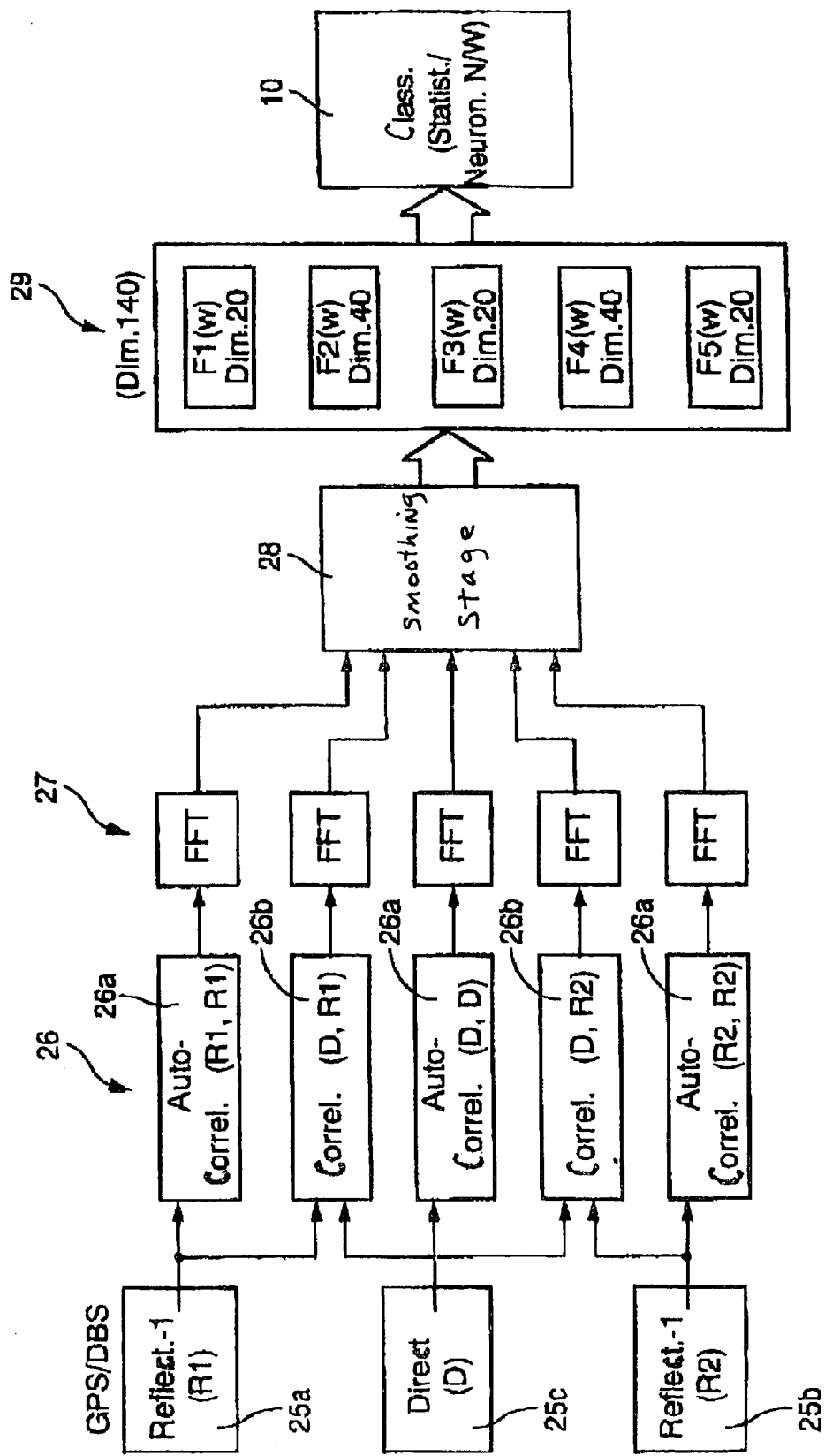
FIG. 4 is a block diagram of a signal processing element for feature derivation within the evaluation element of FIG. 2.

FIG. 4 shows a suitable construction of the feature extraction stage 9. The digitized signals 25a, 25b, 25c, which correspond to the three different scanning radiation components 4a, 4b, 4c received (see FIG. 1), are processed in the three channels of the digitizer to derive features relevant for the later classification. For this purpose, first of all, in a correlation stage 26, each of the three signals 25, 25b, 25c, (that is, the direct signal D and the two "reflected" signals $R_1$, $R_2$, which contain state information on the scanned surface), are subjected to an auto-correlation 26a. In addition, each of the two reflected signals $R_1$, $R_2$ is also correlated with the direct signal D, in parallel with the autocorrelation. An FFT stage 27 is connected to each of the corresponding five output channels of correlation stage 26 in which a 1000 point FFT (Fast Fourier Transformation) is conducted to obtain a performance spectrum. In a subsequent smoothing stage 28, each of the 1000 dimensional five individual vectors is smoothed in the spectral range into a 20 dimensional vector, by forming the mean for blocks of 500 units. Here the auto-correlation spectra of the direct and reflected signals are thus calculated, resulting in three 20 dimensional vectors; and the cross correlation spectra are computed and smoothed, yielding two complex 20 dimensional vectors. From these spectra, a 140 dimensional feature vector 29 consequently arises which is fed to the classification stage 10.

A classification stage 10 classifies the information contained in feature vector 29 concerning the surface condition of the scanned road region (road paving types); that is, a decision is made as to which of several specified road paving types (model states 12a to 12d stored in model memory 11) best corresponds to the recorded and previously processed surface condition data. For this purpose, classification stage 10 can contain, for example, two classifiers: a statistical classifier and a neuronal classifier. The statistical classifier may be of a conventional type which relies on a Mahalanobis distance determination, such as described, for example, in R. O. Duda and P. E. Hardt, Pattern Classification and Scene Analysis, Wiley Interscience, John Wiley, 1973. The neuronal classifier can consist of a, for example, three layer perceptron which is suitably trained with an inverse processing algorithm, which is likewise well known, and is described for example, in the textbook D. E. Rumelhart et al., Learning Internal Representations by Error Propagation, Chapter 8 in Parallel Distributed Processing, Volume 1, Cambridge, MIT Press. The two classifiers are constructed with the aid of training data which consist of a suitable set of feature vectors corresponding to various surface classes (that is, model states) in a well known manner.

In operation, the classification stage in the evaluation element first of all assesses which paving type is contained in the street area just scanned (that is, whether it asphalt, tar, sand, ballast, paving bricks etc.), and then makes a judgment on the momentary surface grip traction condition (that is, whether the road region scanned is dry, whether there is moisture or whether it is covered with ice or snow). The data evaluation for this surface condition assessment is well known from customary active systems for surface condition recognition, and therefore requires no more detailed explanation here. The signals are evaluated with respect to amplitude (that is, the signal output), as well as with respect to their phase and polarization state, for a high recognition exactitude. Alternatively, an evaluation that is limited to amplitude or amplitude and polarization or phase can suffice if, for example, many different road surface states must be recognized, or a diminished exactitude of classification of the same suffices.

The embodiment described above makes clear that, through the invention, a device for recognition of the surface condition of thoroughfares and other earth surface regions is advantageously created which uses useful signal radiation and/or radiation emitted from satellites present in any case as scanning radiation. In this manner, it is practically usable worldwide over a large area without greater modifications in a uniform manner, and does not necessarily require its own scanning radiation generation apparatus. In this way, the additional introduction of radiation into the environment, such as occurs in the case of active systems, together with the radiation generators to be created in addition.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for recognition of a ground surface condition, comprising:

receivers for receiving at least one scanning radiation component that is reflected from a scanned ground surface region and contains surface condition information characterizing said ground surface region;

evaluation resources for determining the surface condition of the scanned ground surface region by evaluating the at least one scanning radiation component;

wherein, the at least one scanning radiation component comprises useful signal radiation generated from a foreign system.

2. The device according to claim 1, wherein the scanned ground surface region comprises a road surface.

3. The device according to claim 1, further comprising at least one satellite for generating the scanning radiation.

4. The device according to claim 1, wherein the useful signal radiation emanates from a source selected from the group consisting of a locating system, a radio transmitting system, and a television transmitting system.

5. The device according to claim 3, wherein the useful signal radiation emanates from a source selected from the group consisting of a locating system, a radio transmitting system, and a television transmitting system.

6. The device according to claim 1, wherein the at least one scanning radiation component further comprises a reference scanning radiation component that is not reflected from the scanned earth surface region.

7. The device according to claim 1, wherein the evaluation resources evaluate received scanning radiation with respect to at least one of amplitude, polarization and phase.

8. The device according to claim 1, wherein the evaluation resources comprise a classification stage which classifies the surface condition of the scanned ground surface region, based on a plurality of stored model conditions.

9. A system for determining the condition of a ground surface area, comprising:

a radiation source for irradiating said ground surface area;

at least one receiver for receiving at least radiation that emanates from said radiation source and is reflected from said ground surface area; and a processor which processes received radiation to determine the condition of the ground surface area;

wherein the radiation source comprises a system that irradiates the ground surface area for a purpose other than determining ground surface conditions.

10. The system according to claim 1, wherein the radiation source comprises at least one of a position determining system, a radio transmitting system and a television transmitting system.

11. The system according to claim 1, wherein the radiation source is satellite based.

12. The system according to claim 10, wherein the radiation source is satellite based.

13. A method for determining the condition of a ground surface area, comprising:
   receiving at lest radiation that emanates from a radiation source and is reflected from said ground surface area; and
   analyzing received radiation to determine the condition of the ground surface area;
   wherein, the radiation source comprises a system that irradiates the ground surface area for a purpose other than determining ground surface conditions.

14. The system according to claim 7, wherein the radiation source comprises at least one of a position determining system, a radio transmitting system and a television transmitting system.

15. The system according to claim 7, wherein the radiation source is satellite based.

16. The system according to claim 14, wherein the radiation source is satellite based.

* * * * *